(12) United States Patent
Pinlam et al.

(10) Patent No.: US 6,394,481 B1
(45) Date of Patent: May 28, 2002

(54) DRAW BAR CLAMP LOCK

(75) Inventors: Watcharin Pinlam, Pathumthanee; Chalor Moogdaharn, Nakornsawan; Youthachai Bupparit, Nonthaburi, all of (TH)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/749,058

(22) Filed: Dec. 27, 2000

(51) Int. Cl.[7] .............................................. B62D 53/00
(52) U.S. Cl. ...................................... 280/510; 280/437
(58) Field of Search ................................ 280/433, 437, 280/497, 510, 508, 411.1, 507

(56) References Cited

U.S. PATENT DOCUMENTS

| | | | |
|---|---|---|---|
| 1,938,407 A | * 12/1933 | Thomas et al. | |
| 3,813,114 A | * 5/1974 | Berends | 280/434 |
| 4,227,713 A | * 10/1980 | Blodgett, Jr. et al. | 280/434 |
| 5,516,137 A | * 5/1996 | Kass et al. | 280/434 |
| 5,641,174 A | * 6/1997 | Terry et al. | 280/434 |
| 6,260,643 B1 | * 7/2001 | Schuchardt | 180/14.1 |

\* cited by examiner

*Primary Examiner*—Avraham Lerner
(74) *Attorney, Agent, or Firm*—Davis Chin

(57) ABSTRACT

A draw bar clamping locking mechanism for locking and unlocking rapidly a draw bar mounted on the front end of a trolley to the rear end of an automatic guided vehicle. The locking bar mechanism includes a locking bar which is moveable rotatably between a locked position where the draw bar is received in a U-shaped slot and an unlocked position where the draw bar is disengaged from the U-shaped slot. A release paddle is provided for unlocking and releasing rapidly the draw bar from the U-shaped slot when depressed downwardly.

12 Claims, 5 Drawing Sheets

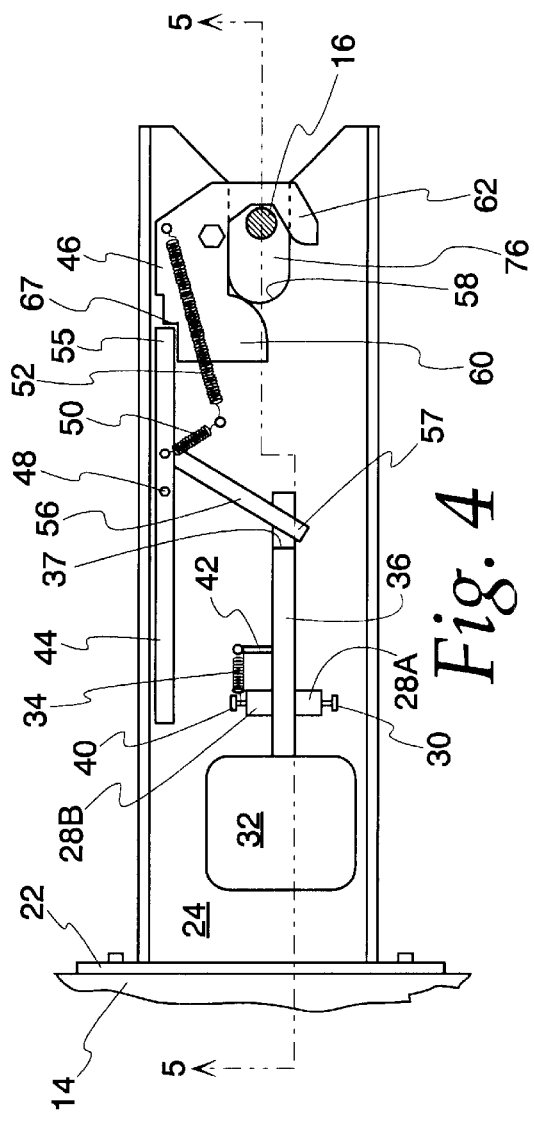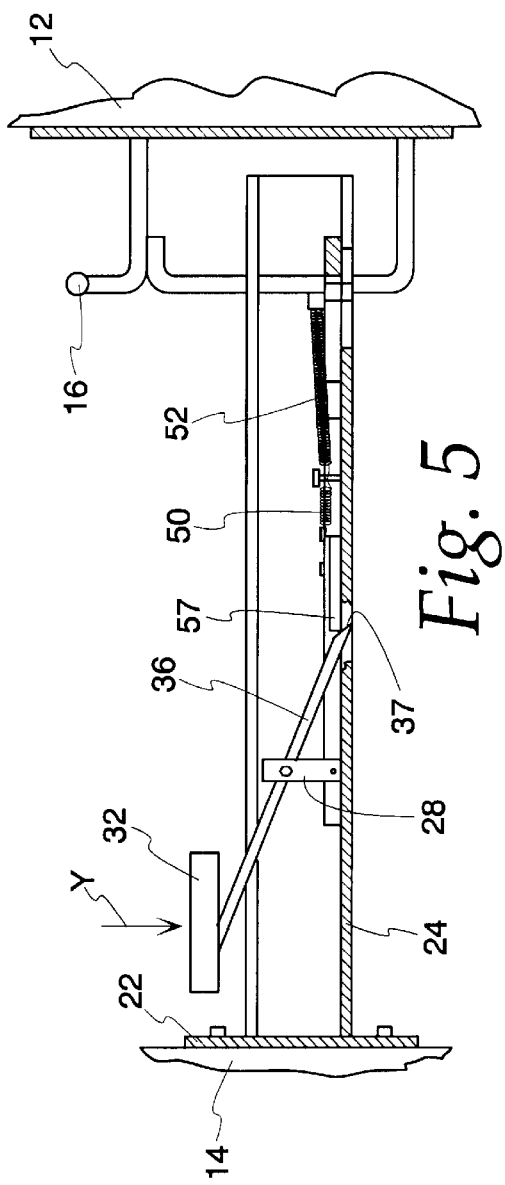

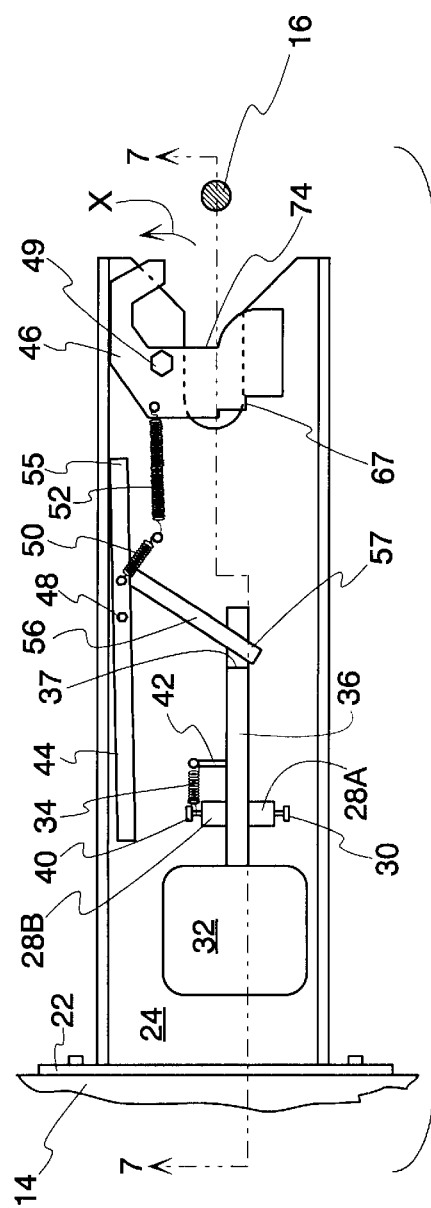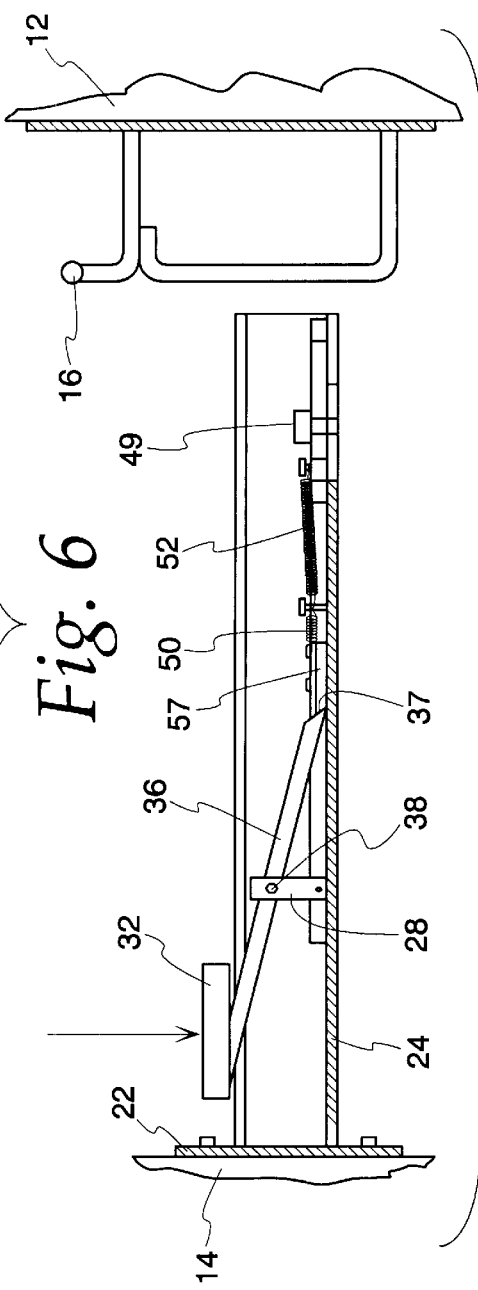
Fig. 6
Fig. 7

DRAW BAR CLAMP LOCK

BACKGROUND OF THE INVENTION

This invention relates generally to automatic guided vehicles (AGV) for carrying loads along a predetermined travel path. More particularly, it relates to a draw bar clamp locking mechanism of a unique construction which is used on an AGV system to facilitate the locking and unlocking of a trolley to an AGV.

In recent years, there has been a trend toward unmanned or automatically operated transport vehicles. One example of the automatic transport vehicles is referred to as an automatic guided vehicle (AGV). As is generally well-known in the art, the automatic guided vehicles (AGV) are load carrying vehicles which travel automatically along a track of reflective tape and are guided by laser beam signals that are reflected off the track. These AGV travel from a base station (e.g., a storage area) to various loading stations along the track. In trailer-type AGV systems, the AGV are basically tractors whose rear end is coupled via a joint structure to the front end of trailers or trolleys loaded with material for pulling them to different destinations along the predetermined travel path.

Due to the prior art joint structure, there have been encountered difficulties in locking and unlocking of the trailer to the tractor in an easy and rapid manner. As a result, this leads to increased labor costs in performing the loading and unloading functions. Therefore, there has arisen a need for a draw bar clamp locking mechanism for facilitating the locking and unlocking of the trolleys to the AGV.

SUMMARY OF THE INVENTION

Accordingly, it is a general object of the present invention to provide a draw bar clamp locking mechanism for facilitating locking and unlocking of a trolley to an AGV which has been traditionally unavailable.

It is an object of the present invention to provide a locking mechanism for coupling the front end of a trolley to the rear end of an AGV on an efficient and effective basis.

It is another object of the present invention to provide a draw bar clamp mechanism of a unique construction used on an AGV system so as to facilitate locking and unlocking of a trailer to an AGV.

It is still another object of the present invention to provide a clamp locking mechanism which includes means for automatically locking a draw bar of a trolley when it is pushed into a locking bar thereof and means for unlocking and releasing the draw bar when a paddle is depressed downwardly.

In a preferred embodiment of the present invention, there is provided a draw bar clamp locking mechanism for locking and unlocking rapidly a draw bar mounted on the front end of a trolley to the rear end of an automatic guided vehicle. The draw bar clamp locking mechanism includes a support member having a U-shaped slot defining a space for receiving the draw bar of the trolley. A locking bar device is disposed adjacent to the support member for moving rotatably between a locked position where the draw bar is received in the U-shaped slot of the support member and an unlocked position where the draw bar is disengaged from the U-shaped slot. A paddle is also arranged on the support member and includes means for releasably holding the locking bar device in the unlocked position and means for unlocking and releasing rapidly the draw bar from the U-shaped slot when depressed downwardly.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 4 is a top plan view of the locking mechanism of the present invention, illustrating the locking bar thereof in a locking engagement with a draw bar of a trolley;

FIG. 5 is a cross-sectional view taken along the lines 5—5 of FIG. 4;

FIG. 6 is a view similar to FIG. 4, but illustrating the locking bar disengaged from the draw bar of the trolley; and FIG. 7 is a cross-sectional view taken along the lines 7—7 of FIG. 6.

DESCRIPTION OF THE PREFERRED EMBODIMENT

Figure 1:
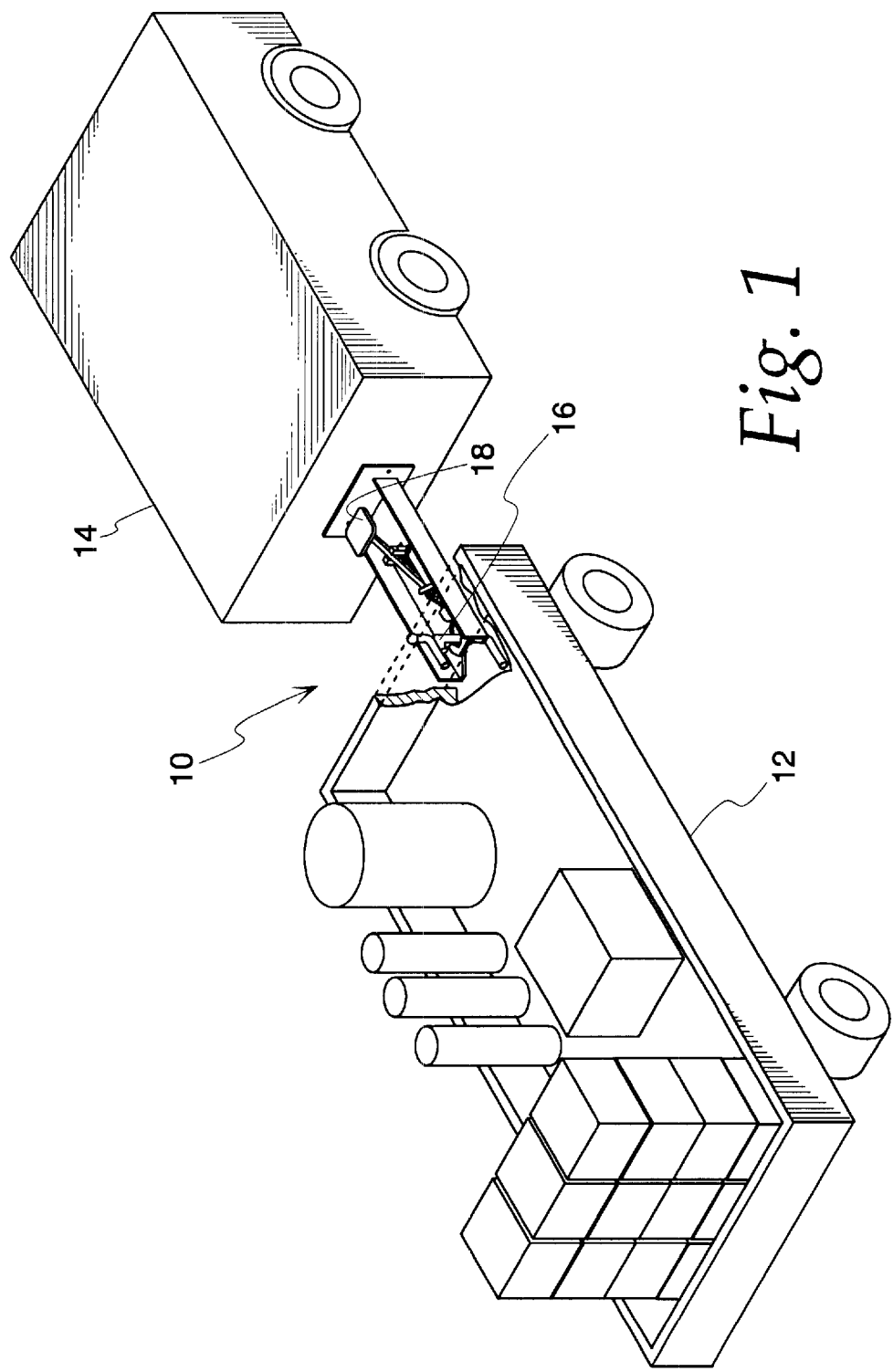
FIG. 1 is a pictorial view of a draw bar clamp locking mechanism according to the present invention for coupling a trolley to an AGV.

Referring now to the various views of the drawings, there is shown in FIG. 1 a pictorial view of a draw bar clamp locking mechanism 10, constructed in accordance with the principles of the present invention, for hooking or coupling into engagement the front end of a trailer or trolley 12 to the rear end of an automatic guided vehicle (AGV) 14. The AGV 14 travels along a track (not shown) of reflective tape and is guided by laser beam signals which are reflected off the track. The AGV 14 is moveable from a base station (not shown) such as a storage area to various loading stations (also not shown) along the track. The AGV 14 defines basically a tractor which is used to pull one or more of the trolleys 12 (i.e., up to three) loaded with materials to the different destinations along the predetermined path or route.

The draw bar clamp locking mechanism 10 of the present invention is of a new and novel construction and is mounted generally on the rear end of the AGV or tractor 14. The locking mechanism 10 serves to facilitate the automatic locking of a draw bar 16 mounted on the front end of the trolley 12 when it is pushed into contact engagement with the rear end of the AGV. Further, the locking mechanism includes means for quickly unlocking and releasing of a locking bar from the draw bar 16 of the attached trolley 12 when a release paddle 18 is depressed downwardly.

Figure 2:
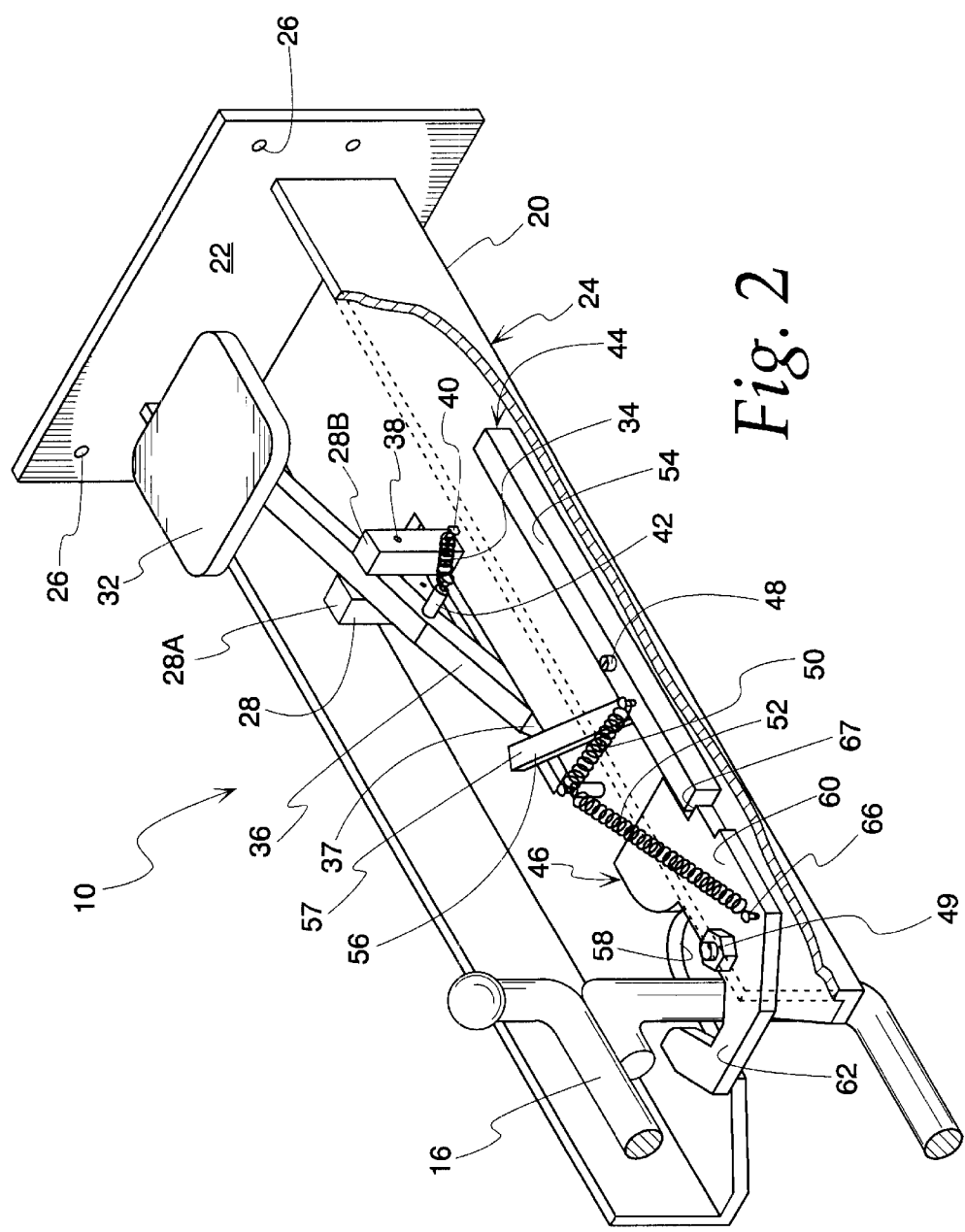
FIG. 2 is a perspective view of the draw bar clamp locking mechanism of FIG. 1.
Figure 3:
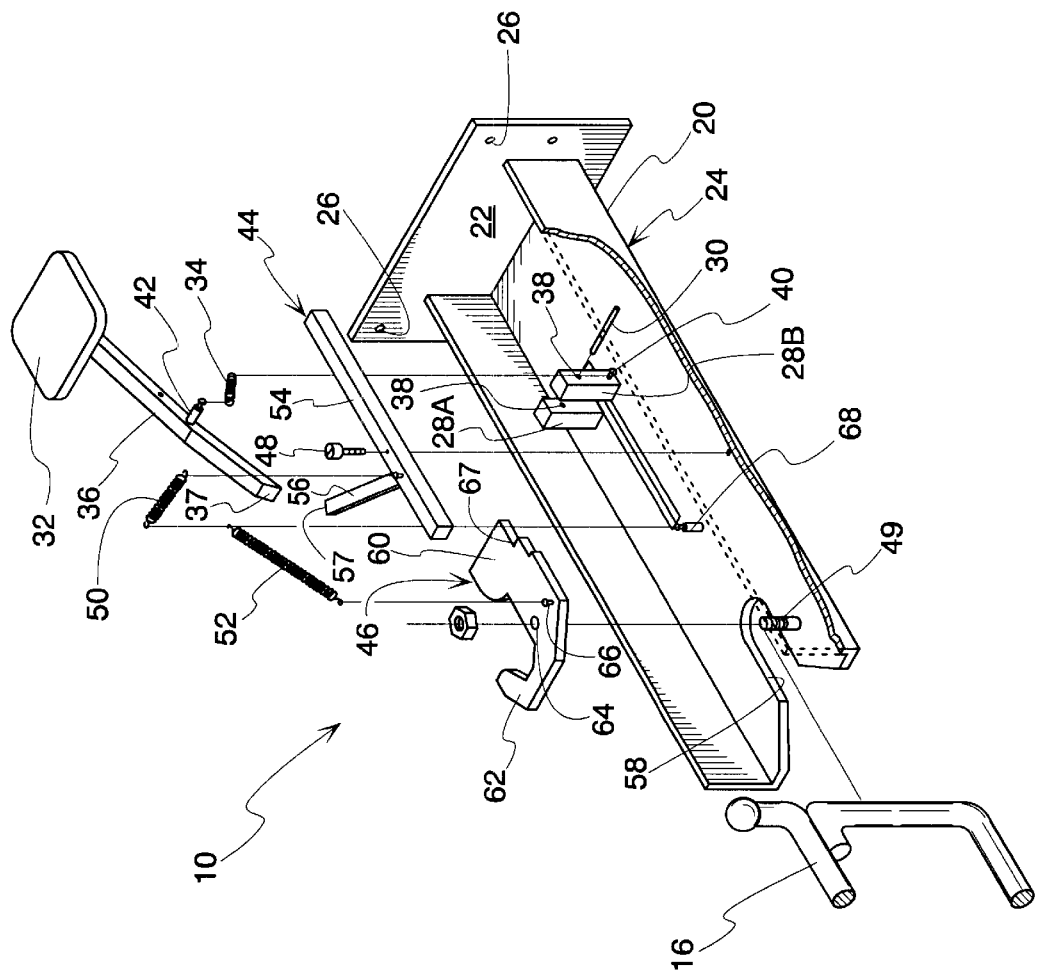
FIG. 3 is an exploded view of the locking mechanism of FIG. 2.

As can be seen from FIGS. 2 and 3, the draw bar clamping locking mechanism 10 is comprised of a clamp lock block 20 formed of a vertical mounting plate 22 and a horizontal support member 24 integrally connected at its one end to the mounting plate 22. The mounting plate 22 is of a generally rectangular shape and is provided with a plurality of mounting holes 26 for receiving bolts, screws or the like therethrough for fixedly securing the lock block 20 to the rear end of the AGV or tractor 14. The clamp lock block 20 is preferably formed of a metallic material, such as steel, cast iron and the like.

The locking mechanism 10 further includes a paddle housing 28, a paddle shaft 30, a release paddle 32, and a paddle spring 34. The paddle housing 28 is of a generally U-shaped configuration and includes spaced-apart arms 28a and 28b connected by a bight portion 28c. The bight portion 28c is preferably mounted on the top surface of the horizontal support member 24 approximately one-third of the distance from the vertical mounting plate 22. The paddle 32 is formed of a generally square shape and has an axle 36 extending therefrom.

A portion of the axle 36 adjacent to the paddle 32 is positioned between the arms 28a, 28b of the paddle housing 28 and is held in place by the paddle shaft 30 which is received in apertures 38 formed in the respective arms. One end of the paddle spring 34 is secured to a lug 40 of the paddle housing 28, and the other end thereof is secured to a lug 42 of the axle 36. The paddle spring 34 functions to hold the release paddle 32 in the locked or upright position. The release paddle 32 is designed to be pivotally mounted about the paddle shaft 30. The release paddle is used to manually unlock the trolley 12 from the tractor 14 when it is depressed downwardly by the foot of an operator.

The locking mechanism 10 further includes a locking cantilever member 44, a locking bar 46, a locking cantilever shaft 48, a locking bar shaft 49, a locking cantilever spring 50, and a locking bar spring 52. The locking cantilever member 44 includes an elongated bar 54 and a short, transverse arm 56 having its one end joined angularly to the elongated bar 54. Adjacent to the free end of the horizontal support member 24, there is provided a U-shaped slot 58 formed in the center thereof. The locking cantilever shaft 48 serves to pivotally mount one end of the elongated bar of the cantilever member 44 on the top surface of the support member 24.

The locking bar shaft 49 is fixedly mounted adjacent to one side of the U-shaped slot 58 and extends upwardly from the top surface of the support member 24. The locking bar 46 is formed of a generally hooked-shape construction and consists of a base portion 60 and a leg portion 62 formed integrally with the base portion 60. The base portion 60 includes a centrally-located aperture 64 so as to rotatably mount the locking bar 46 onto the locking bar shaft 49. The base portion 60 also has a small pin 66 disposed adjacent to the aperture 64 and a notch 67 formed on its top section.

One end of the locking. cantilever spring 50 is secured to the locking cantilever member 44 at the junction of the elongated bar 54 and the short arm 56. The other end of the cantilever spring 50 is secured fixedly to a mounting post 68 positioned on the top surface of the horizontal support member 24. One end of the locking bar spring 52 is also connected to the mounting post 68. The other end of the locking bar spring 52 is secured in the small pin 66 in the base portion 60 of the locking bar 46.

The operation of the draw bar clamp locking mechanism 10 of the present invention in FIG. 1 for locking and unlocking the locking bar 46 with respect to the draw bar 16 mounted on the trolley 12 will be described below with reference to FIGS. 4 through 7. FIGS. 4 and 5 show the locking bar 46 of the locking mechanism 10 in locking contact engagement with the draw bar 16 so as to define a locked or closed position. FIGS. 6 and 7 are views similar to respective FIGS. 4 and 5, but show the locking bar disengaged from the draw bar so as to define an unlocked or open position.

Initially, it will be assumed that the AGV 14 is not coupled to the trolley 12. Thus the locking mechanism 10 in this condition will be in the unlocked position, as shown in FIGS. 6 and 7. In order to securely attach or connect the front end of the trolley 12 to the rear end of the AGV 14, the draw bar 16 is pushed into contact engagement with the locking bar 46 of the locking mechanism so as to obtain the locked position, as shown generally in FIG. 1 and in detail in FIGS. 4 and 5.

Referring now back to FIGS. 6 and 7, it will be noted that the release paddle 32 is in a down position and the tip 37 at the free end of the axle 36 engages the free end 57 of the short arm 56 of the locking cantilever member 44. As a result, the cantilever member 44 has been rotated in a counter-clockwise direction about the locking cantilever shaft 48. This, in turn, has caused the locking bar 46 to have been rotated in the counter-clockwise direction via the locking bar spring 52 and the locking cantilever spring 50. The locking bar spring 52 has urged the locking bar 46 to be rotated counter-clockwise in the direction of arrow X (FIG. 6) about an axis of the locking bar shaft 49. Thus, the locking bar 46 is held in the unlocked or open position by the force of the locking bar spring 52 created by the locking cantilever member 44.

When the draw bar 16 of the trolley 12 is pushed against the surface 74 of the locking bar 46, the locking bar will be rotated clockwise opposite to the direction of the arrow X about the axis of the locking bar shaft 49 against the tension of the locking bar spring 52 so as to move the same to its fully extended position, as shown in FIGS. 4 and 5. The clockwise movement of the locking bar 46 will also cause a likewise clockwise movement of the cantilever member 44 so as to disengage the free end 57 of the arm 56 from the tip 37 of the axle 36. As a result, the paddle spring 34 will cause the axle 36 to be rotated in the clockwise direction about an axis of the paddle shaft 30. Thus, the release paddle will be held in an upright position, as shown in FIG. 4.

In this manner, the trolley 12 of FIG. 1 will be coupled to the AGV 14 by the locking mechanism 10. It will be noted that the draw bar 16 is received within an area or space 76 defined by the U-shaped slot 58. Further, the leg portion 62 of the locking bar 46 is in operative alignment with the U-shaped slot 58 so as to sandwich or trap the draw bar of the trolley there-between. It should be apparent to those skilled in the art that the end 55 of the elongated bar 54 is in contact engagement with the notch 67 on the base portion 60 of the locking bar 46 so as to hold the same in the locked position.

In order to disengage or release the trolley 12 from the AGV 14 on an efficient and effective basis, the inventors of the present invention have provided the release paddle 32 of the locking mechanism 10, which is used for manually unlocking the trolley by simply stepping on or depressing the same. As shown in FIG. 1, the unlocking function can be easily and rapidly performed by an operator through stepping down on top of the surface of the release paddle with his foot.

With reference back to FIGS. 4 and 5, when the release paddle 32 is depressed down in the direction of arrow Y with the foot of the operator, the axle 36 thereof will be caused to pivot counter-clockwise about the axis of the paddle shaft 30 arranged in the paddle housing 28 against the tension of the paddle spring 34. As previously pointed out, the paddle spring 34 is used to hold the release paddle 32 in the upright position, as shown in FIG. 4. The tip 37 at the free end of the axle 36 will become engaged with the free end 57 of the short arm 56 of the cantilever member 44 so as to cause the same to rotate counter-clockwise about the axis of the locking cantilever shaft 48. As a consequence, the end 55 of the elongated bar 54 of the locking cantilever member 44 will be disengaged from the notch 67 of the locking bar 46. This allows the locking bar spring 52 to pull against the weight of the locking arm 46 so as to rotate the same in the counter-clockwise direction to the opened position as shown in FIG. 6. In this fashion, the draw bar 16 of the trolley 12 of FIG. 1 will be disengaged from the locking mechanism 10 mounted on the AGV 14.

From the foregoing detailed description, it can thus be seen that the present invention provides a draw bar clamp locking mechanism for locking and unlocking a draw bar mounted on the front end of a trolley to the rear end of an AGV in an efficient and effective basis. The locking mechanism includes a locking bar which is moved rotatably between a locked position where the draw bar is received in a U-shaped slot and an unlocked position where the draw bar is disengaged from the U-shaped slot. A release paddle is provided for unlocking and releasing rapidly the draw bar from the U-shaped slot when depressed downwardly with the foot of an operator.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A draw bar clamp locking mechanism for locking and unlocking rapidly a draw bar mounted on the front end of a trolley to the rear end of an automatic guided vehicle, said locking mechanism comprising:

clamp Lock block means adapted for mounting to the rear end of the automatic guided vehicle, said block means being formed of a vertical mounting plate and a horizontal support member connected integrally at its one end to said mounting plate;

locking bar means being disposed adjacent to the free end of said horizontal support member for moving rotatably about a mounting post between an unlocked position and a locked position;

locking cantilever means being disposed on the top surface of said horizontal support member for moving rotatably about a cantilever shaft between the unlocked position and the locked position;

first compression means for interconnecting said locking cantilever means and said locking bar means;

paddle means being disposed also on said horizontal, support member for moving rotatably about a paddle shaft between an upright position and a down position, said paddle means being formed of a paddle and an axle extending therefrom;

second compression means for holding said paddle in the upright position when said locking bar means is in the locked position; and said paddle being depressable for moving rotatably said axle about said paddle shaft so as to cause the free end of said axle to contactly engage said locking cantilever member means thereby allowing it to move in a counter-clockwise direction to the unlocked position.

2. A draw bar clamp locking mechanism as claimed in claim 1, wherein said vertical mounting plate is of a generally rectangular shape and is provided with a plurality of mounting holes for fixedly securing said clamp lock block means to the rear of said automatic guided vehicle.

3. A draw bar clamp locking mechanism as claimed in claim 2, wherein said mounting plate and said support member are formed of a metallic material, such as steel, cast iron and the like.

4. A draw bar clamp locking mechanism as claimed in claim 3, wherein said locking bar means has a generally hooked-shaped construction and consists of a base portion and a leg portion formed integrally with said base portion, said base portion having centrally-located aperture so as to rotatably mount said locking bar means to said mounting post.

5. A draw bar clamp locking mechanism as claimed in claim 4, wherein said locking cantilever means is comprised of an elongated bar and a short, transverse arm joined angularly to said elongated bar, said elongated bar being rotatably mounted on said cantilever shaft.

6. A draw bar clamp locking mechanism as claimed in claim 5, wherein said first compression means includes a locking cantilever spring interconnected between said elongated bar of said locking cantilever means and a mounting post and a locking bar spring interconnected between the mounting post and said base portion of said locking bar means.

7. A draw bar clamp locking mechanism as claimed in claim 6, wherein said paddle is of a square construction and is used to receive a foot of an operator for depressing downwardly the same so as to manually rotate said leg portion in the counter-clockwise direction for unlocking and releasing the draw bar mounted on the front end of the trolley.

8. A draw bar clamp locking mechanism as claimed in claim 7, wherein in second compression means is comprised of a paddle spring interconnected between a paddle housing and the axle of said paddle means.

9. A draw bar clamp locking mechanism as claimed in claim 8, wherein said free end of said horizontal support member is formed with a U-shaped slot defining a space for receiving the draw bar of the trolley and trapping the same between said U-shaped slot and said leg portion of said draw bar in the locked position.

10. A draw bar clamp locking mechanism for locking and unlocking rapidly a draw bar mounted on the front end of a trolley to the rear end of an automatic guided vehicle, said locking mechanism comprising:

coupling means including a U-shaped slot defining a space for receiving the draw bar of the trolley;

locking bar means being disposed adjacent to said coupling means for moving rotatably between a locked position where said draw bar is received in the U-shaped slot of said coupling means and an unlocked position where said draw bar is disengaged from said U-shaped slot;

paddle means disposed on said coupling means for unlocking and releasing rapidly said draw bar from said U-shaped slot when depressed downwardly;

locking cantilever means disposed on said coupling means for holding said locking bar means in the locked position and for unlocking and releasing said locking bar means so as to allow it to move to the unlocked position;

clamp lock block means adapted for mounting to the rear end of the automatic guided vehicle, said block means being formed of a vertical mounting plate and a horizontal support member connected integrally at its one end to said mounting plate;

said vertical mounting plate being formed of a generally rectangular shape and provided with a plurality of mounting holes for fixedly securing said clamp lock block means to the rear of said automatic guided vehicle;

said mounting plate and said support member being formed of a metallic material, such as steel, cast iron and the like; and said locking bar means having a-generally hooked-shaped construction and consisting of a base portion and a leg portion formed integrally with said base portion, said base portion having a centrally-located aperture so as to rotatably mount said locking bar means to a mounting post.

11. A draw bar clamp locking mechanism as claimed in claim 10, further comprising locking cantilever means responsive to said paddle means and is formed of an elongated bar and a short, transverse arm joined angularly to said elongated bar, said elongated bar being rotatably mounted on a cantilever shaft.

12. A draw bar clamp locking mechanism as claimed in claim 10, wherein said paddle means is of a square construction and is used to receive a foot of an operator for depressing downwardly the same so as to manually rotate said locking bar means in the counter-clockwise direction for unlocking and releasing the draw bar mounted on the front end of the trolley.

* * * * *

UNITED STATES PATENT AND TRADEMARK OFFICE
CERTIFICATE OF CORRECTION

PATENT NO. : 6,394,481 B1
DATED : May 28, 2002
INVENTOR(S) : Watcharin Pinlam et al.

It is certified that error appears in the above-identified patent and that said Letters Patent is hereby corrected as shown below:

<u>Column 4,</u>
Line 38, change "there-between" to -- therebetween --.

Signed and Sealed this

Sixteenth Day of July, 2002

*Attest:*

*Attesting Officer*

JAMES E. ROGAN
*Director of the United States Patent and Trademark Office*